United States Patent [19]
Bauman et al.

[11] Patent Number: 6,167,489
[45] Date of Patent: Dec. 26, 2000

[54] SYSTEM AND METHOD FOR BYPASSING SUPERVISORY MEMORY INTERVENTION FOR DATA TRANSFERS BETWEEN DEVICES HAVING LOCAL MEMORIES

[75] Inventors: Mitchell A. Bauman, Circle Pines; Roger Lee Gilbertson, Minneapolis; Michael L. Haupt, Roseville, all of Minn.

[73] Assignee: Unisys Corporation, Blue Bell, Pa.

[21] Appl. No.: 09/218,811

[22] Filed: Dec. 22, 1998

[51] Int. Cl.⁷ ...................................................... G06F 13/00
[52] U.S. Cl. ........................... 711/145; 711/156; 711/148; 711/119; 711/141; 710/132
[58] Field of Search ..................................... 711/144, 145, 711/141, 156, 154, 148, 206, 207, 208, 138, 119, 130; 710/39, 132, 21, 5

[56] References Cited

U.S. PATENT DOCUMENTS

| | | | |
|---|---|---|---|
| 5,297,269 | 3/1994 | Donaldson et al. | 711/145 |
| 5,537,569 | 7/1996 | Masubuchi | 711/121 |
| 5,636,365 | 6/1997 | Tanioka | 711/163 |
| 5,761,532 | 6/1998 | Yarch et al. | 710/22 |
| 6,052,760 | 4/2000 | Bauman et al. | 711/119 |
| 6,073,251 | 6/2000 | Jewett et al. | 714/7 |
| 6,078,997 | 6/2000 | Young et al. | 711/144 |

*Primary Examiner*—Do Hyun Yoo
*Assistant Examiner*—Hong Kim
*Attorney, Agent, or Firm*—Charles A. Johnson; Mark T. Starr; Altera Law Group

[57] ABSTRACT

A system and method for providing direct transfers of data segments between devices having local memories without the need for first transferring the data to a central supervisory memory to maintain cache coherency. Direct data transfers are performed from a first local memory of a first device to a second local memory in a second device in a transaction processing system that includes a main memory to provide supervisory storage capability for the transaction processing system, and a directory storage for maintaining ownership status of each data segment of the main memory. A data transfer of a requested data segment is requested by the second device to obtain the requested data segment stored in the first local memory of the first device. The requested data segment is removed from the first local memory in response to the data transfer request, and is directly transferred to the second local memory of the second device. The requested data segment is also transferred to the main memory, and to the directory storage where the ownership status can be revised to reflect a change of ownership from the first device to the second device. The direct transfer of the requested data segment between the first and second devices occurs independently of the transfer of the requested data segment from the first device to the main memory and directory storage.

34 Claims, 10 Drawing Sheets

SUB-PROCESSING MODULE (SUB-POD)

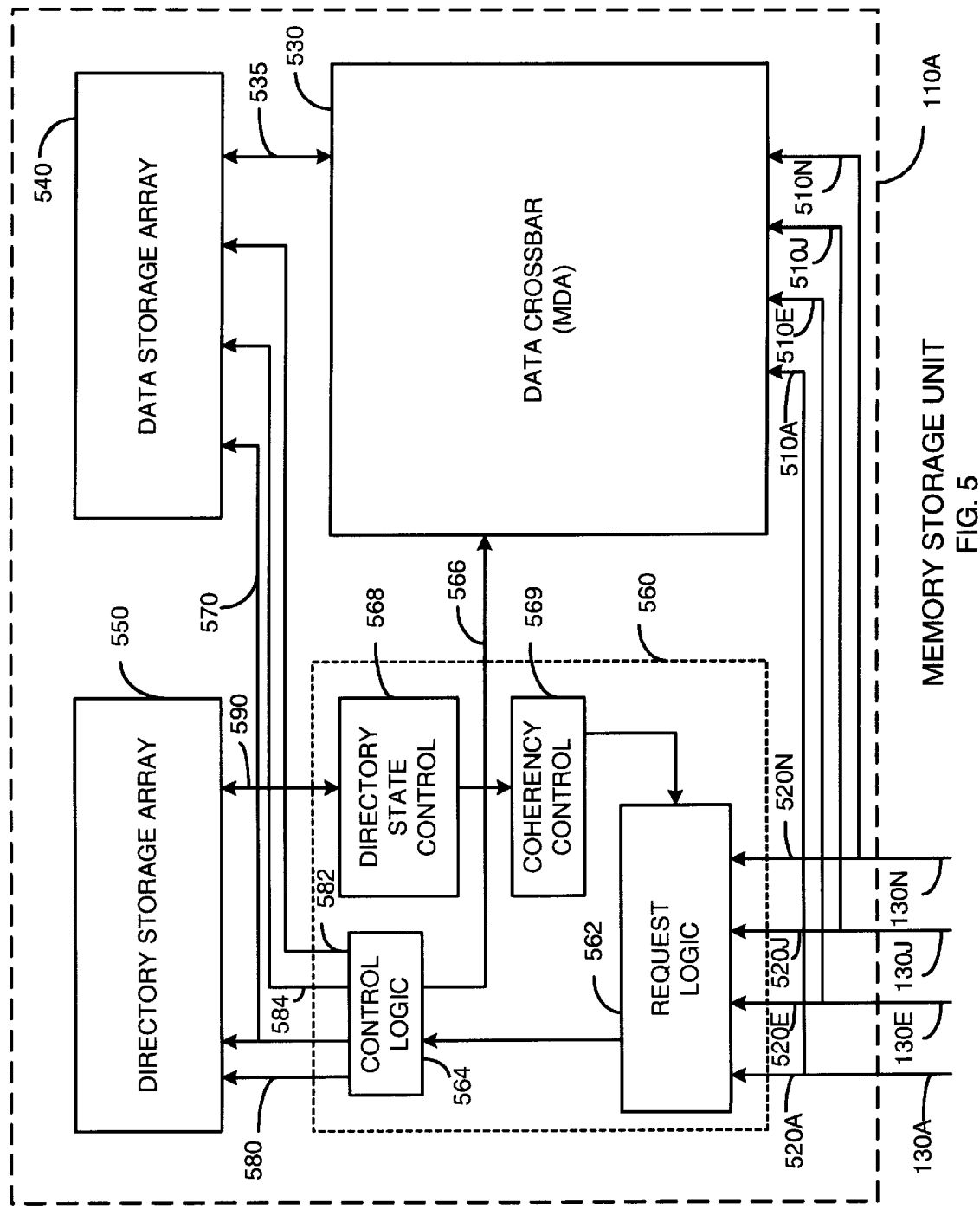

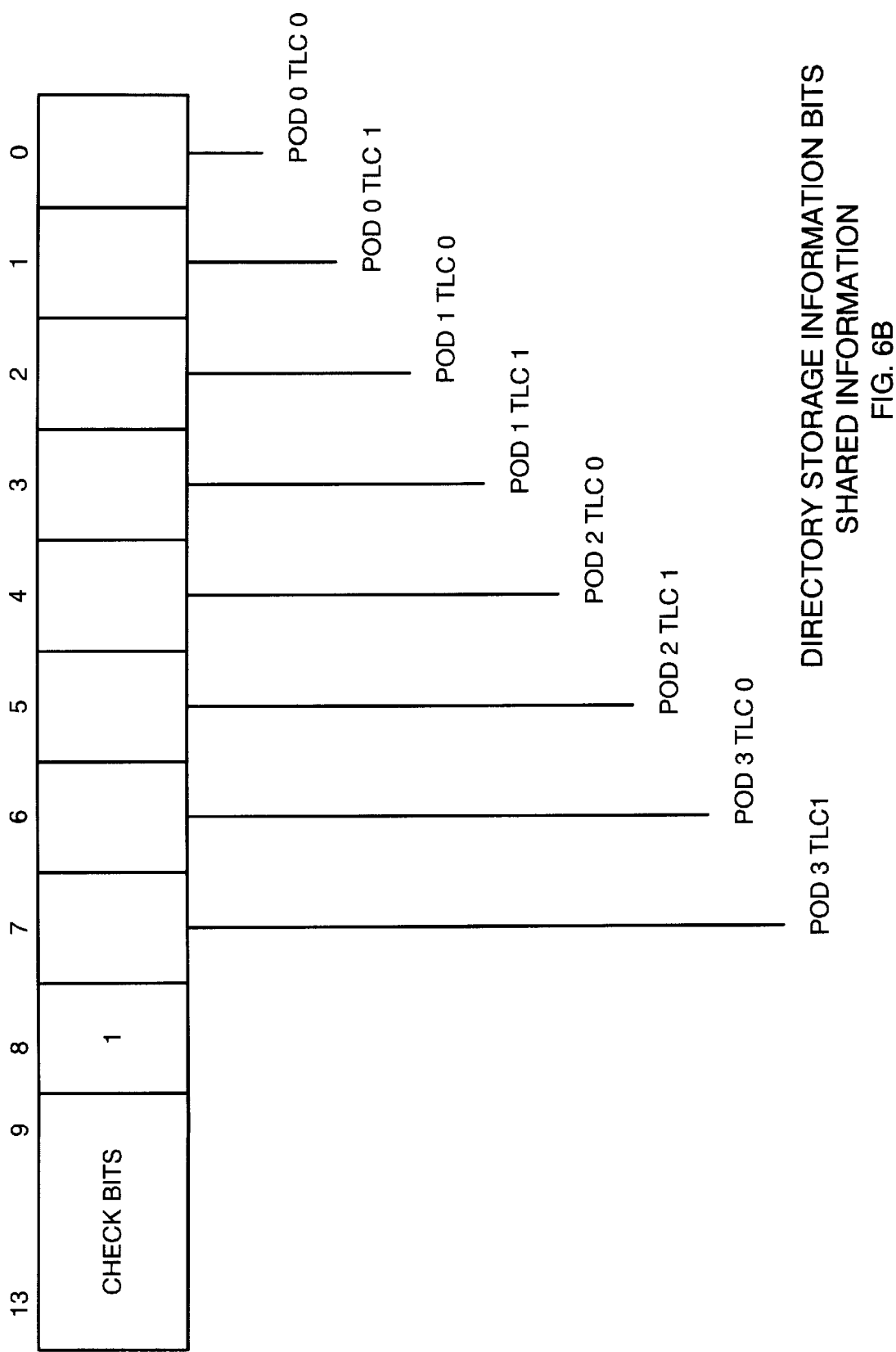

SYSTEM AND METHOD FOR BYPASSING SUPERVISORY MEMORY INTERVENTION FOR DATA TRANSFERS BETWEEN DEVICES HAVING LOCAL MEMORIES

CROSS-REFERENCE TO OTHER PATENT APPLICATIONS

The following co-pending patent application of common assignee contains some common disclosure:

"Bi-directional Interface Distributed Control Mechanism", filed Jun. 12, 1998, Ser. No. 09/096,624, which is incorporated herein by reference in its entirety;

"Queueing Architecture And Control System For Data Processing System Having Independently-Operative Data And Address Interfaces", filed Jun. 12, 1998, Ser. No. 09/096,822, which is incorporated herein by reference in its entirety;

"High-Performance Modular Memory System With Cross bar Connections"; filed Dec. 31, 1997, Ser. No. 09/001,592, which is incorporated herein by reference in its entirety; and "Directory Based Cache Coherency System Supporting Multiple Instruction Processor and Input/Output Caches"; filed Dec. 31, 1997, Ser. No. 09/001,598, which is incorporated herein by reference in its entirety.

FIELD OF THE INVENTION

This invention relates generally to cache coherency schemes for use in multiprocessing, shared memory systems, and more particularly to a system and method for providing direct data transfers between modules having local memories, thereby selectively bypassing the need to route data through a centralized memory while maintaining complete cache coherency at the centralized memory.

BACKGROUND OF THE INVENTION

Large-scale data processing systems typically utilize a tremendous amount of memory. This is particularly true in multiprocessing systems where multiple processing units and numerous input/output modules are implemented. There are several memory methodologies known in the art that provide for efficient use of memory in such multiprocessing environments. One such memory methodology is a distributed memory where each processor has access to its own dedicated memory, and access to another processor's memory involves sending messages via an inter-processor network. While distributed memory structures avoid problems of contention for memory and can be implemented relatively inexpensively, it is usually slower than other memory methodologies, such as shared memory systems.

Shared memory is used in a parallel or multiprocessing system, and can be accessed by more than one processor. The shared memory is connected to the multiple processing units—typically accomplished using a shared bus or network. Large-scale shared memories may be designed to cooperate with local cache memories associated with each processor in the system. Cache consistency protocols, or coherency protocols, ensure that one processor's locally-stored copy of a shared memory location is invalidated when another processor writes to that shared memory location.

More particularly, when multiple cache memories are coupled to a single main memory for the purpose of temporarily storing data signals, some system must be utilized to ensure that all processors, such as instruction processors (IPs) are working from the same (most recent) copy of the data. For example, if a copy of a data item is stored, and subsequently modified in a cache memory, another IP requesting access to the same data item must be prevented from using the older copy of the data item stored either in main memory or the requesting IP's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data existed within a local cache, other processors were prohibited from obtaining a copy of the data from main memory until the updated copy was returned to main memory, thereby releasing the lock. For complex systems, the additional hardware and/or operating time required for setting and releasing the locks within main memory cannot be justified. Furthermore, reliance on such locks directly prohibits certain types of applications such as parallel processing. Other manners of maintaining cache coherency exist, such as memory bus "snooping", and other techniques.

For distributed systems having hierarchical memory structures, a directory-based coherency system becomes more practical. Directory-based coherency systems utilize a centralized directory to record the location and the status of data as it exists throughout the system. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so it may be provided to the requesting cache. The central directory is then updated to reflect the new status for that unit of memory.

However, due to the ever-increasing number of processing devices and I/O modules capable of being configured within a single system, it has become quite common for one processing module or I/O module to request data that is currently "owned" by another processing or I/O module. Typically, such a request involves a first request by a central supervisory memory to have the data and ownership returned to that central memory, such as a main computer memory. The current owner of the valid data then transfers both the current data and ownership back to the central memory which must then provide the data to the requesting processing or I/O module in a conventional manner. While such a system facilitates cache coherency maintenance, it results in unnecessary latencies, particularly where there are a large number of potential local or cache memories external to the main memory.

It would therefore be desirable to provide a system and method for directly transferring locally-stored data, such as cached data, between requesters while maintaining cache coherency. The present invention provides a solution to the shortcomings of the prior art, and offers numerous advantages over existing cache coherency methodologies.

SUMMARY OF THE INVENTION

The present invention relates to a system and method for providing direct transfers of data segments, such as cache lines, between devices having local memories, such as cache memories, without the need for first transferring the data to a central supervisory memory to maintain cache coherency. This data bypass system and method therefore allows requested data segments stored in a first device to bypass the main memory and travel directly from its current local memory to a requesting device, while also providing for the independent return of the data segment from its current local memory to the main supervisory memory in order to maintain memory coherency.

In accordance with one embodiment of the invention, a method is provided for performing direct data transfers from a first local memory of a first device to a second local memory in a second device. The method is for use in a transaction processing system that includes a main memory to provide supervisory storage capability for the transaction processing system, and includes a directory storage for maintaining ownership status of each data segment of the main memory. The method includes requesting a data transfer of the requested data segment in the first local memory to the second local memory. The requested data segment is removed from the first local memory in response to the data transfer request, and directly transferred to the second local memory of the second device. The requested data segment is removed from the first local memory where the data transfer request is one in which ownership of the data is desired, for example where write privileges are desired. The requested data segment may remain in the first local memory if the data transfer request is one where only a copy of the data is desired, such as in a read-only request. The requested data segment is also transferred to the main memory, and to the directory storage where the ownership status can be revised to reflect a change of ownership from the first device to the second device. In the case of a read-only data transfer request, the requested data segment may remain in the first local memory, but ownership must be removed. The direct transfer of the requested data segment between the first and second devices occurs substantially independently of the transfer of the requested data segment from the first device to the main memory and directory storage.

In accordance with another embodiment of the invention, a system for bypassing supervisory memory intervention for data transfers between first and second devices is provided. Each of the first and second devices include associated local memories, such as cache memories. The supervisory memory includes a data storage array for providing a centralized storage location for data segments, and further includes a directory storage array for maintaining ownership status of each of the data segments. The system allows a direct transfer of data where the first device requests a transfer of a data segment that is currently residing in the local memory of the second device. The system includes a routing control circuit that provides control signals to direct the movement of the requested data segment in response to a data fetch command provided by the first device. An input queue is coupled to receive the requested data segment from the local memory of the second device in response to first ones of the control signals. An output queue is coupled to receive a first copy of the requested data segment from the input queue in response to second ones of the control signals. The output queue completes the direct data transfer by providing the requested data segment to the local memory of the first device when the requested data segment becomes available in the output queue. A crossbar interconnect circuit is coupled to the routing control circuit to receive third ones of the control signals, and is further coupled to the input queue to receive a second copy of the requested data segment from the input queue. The crossbar interconnect circuit, in response to the third control signals, forwards the second copy of the requested data segment to the supervisory memory to be stored and to revise the ownership status of the requested data segment to reflect new ownership by the first device. The transfer of the requested data segment from the second device to the first device is independent of the transfer of the requested data segment from the second device to the supervisory memory.

In accordance with yet another embodiment of the invention, a system is provided for performing a direct data transfer from a first device having a requested data segment stored in a first local memory to a second device having a second local memory. The system includes a main memory to provide supervisory storage capability, and a directory storage for maintaining ownership status of each data segment of the main memory. A circuit for requesting a data transfer of the requested data segment in the first local memory to the second local memory of the second device is provided. Another circuit conditionally removes the requested data segment from the first local memory in response to the data transfer request. The system includes a circuit that transfers the requested data segment to the second local memory of the second device, while a separate circuit transfers the requested data segment to the main memory and the directory storage to respectively store the requested data segment and revise the ownership status to reflect a change of ownership from the first device to the second device. The transfer of the requested data segment to the second local memory is not dependent upon the transfer of the requested data segment to the main memory and directory storage.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

FIG. 5 is a block diagram of one embodiment of a Memory Storage Unit (MSU);

FIGS. 6A and 6B are Directory Storage Information Bit Formats used to encode the directory in accordance with one embodiment of the invention;

DETAILED DESCRIPTION OF THE ILLUSTRATED EMBODIMENTS

The present invention is directed to a system and method for facilitating efficient transfers of data from a first auxiliary memory to a second auxiliary memory. The invention allows a requested data segment or cache line stored in a local memory to avoid the need to be returned to the main supervisory memory in a system before being provided to another local memory in another device. This data bypass system and method therefore allows the requested data to bypass the main memory and travel directly from its current cache location to the requesting device, while also providing for the independent return of the cache line from its current cache location to the main supervisory memory in order to maintain cache coherency.

While the present invention is particularly advantageous in the context of a Symmetrical Multi-Processor (SMP) environment as described below, it will be appreciated by those skilled in the art that the invention may be equally applicable to other computing environments requiring management of cache coherency. Further, the example computing environment described below includes a description of a directory-based cache coherency system within which the present invention is particularly useful. Therefore, the SMP environment and related cache coherency system described in FIGS. 1–6B below is provided for illustrative purposes and to provide a context from which a full operational understanding of the present invention may be obtained; however the invention is not limited thereto.

Figure 1:
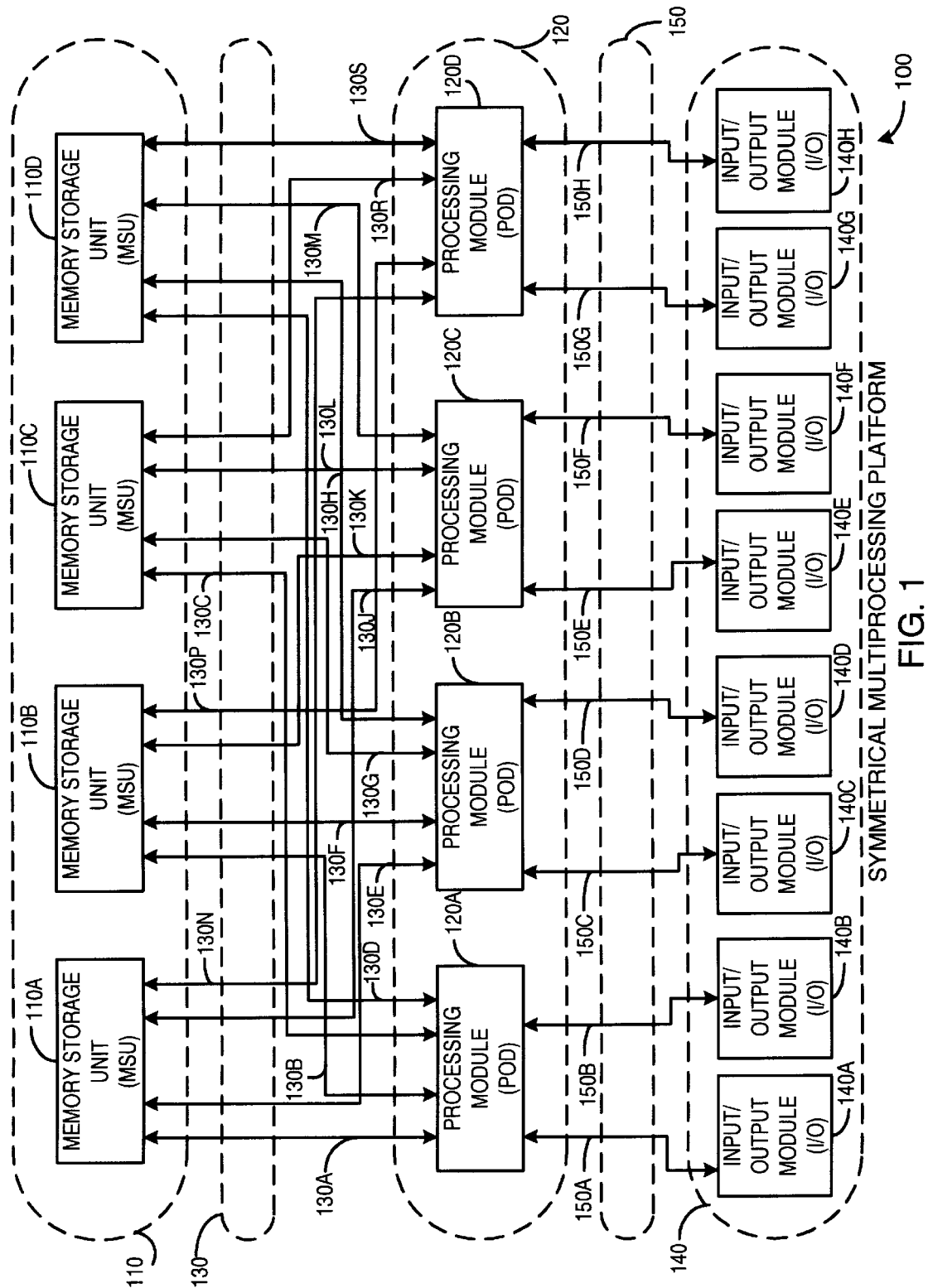
FIG. 1 is a block diagram of a Symmetrical Multi-Processor (SMP) System Platform in which the principles of the present invention may be applied.

FIG. 1 is a block diagram of a Symmetrical Multi-Processor (SMP) System Platform in which the principles of the present invention may be applied. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In this example SMP environment, MI 130 comprises separate bi-directional data and bi-directional address/command interconnections, and further includes unidirectional control lines that control the operation on the data and address/command interconnections (not individually shown). The control lines operate at a system clock frequency (SYSCLK) while the data bus runs source synchronous at two times the system clock frequency (2× SYSCLK). For example, in one embodiment, the system clock frequency is approximately 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but may have a transfer rate that is approximately half the transfer rate of the MI Interfaces because the I/O Modules 140 are located at a greater distance from the PODs 120 than are the MSUs 110 and produce different timing considerations.

Figure 2:
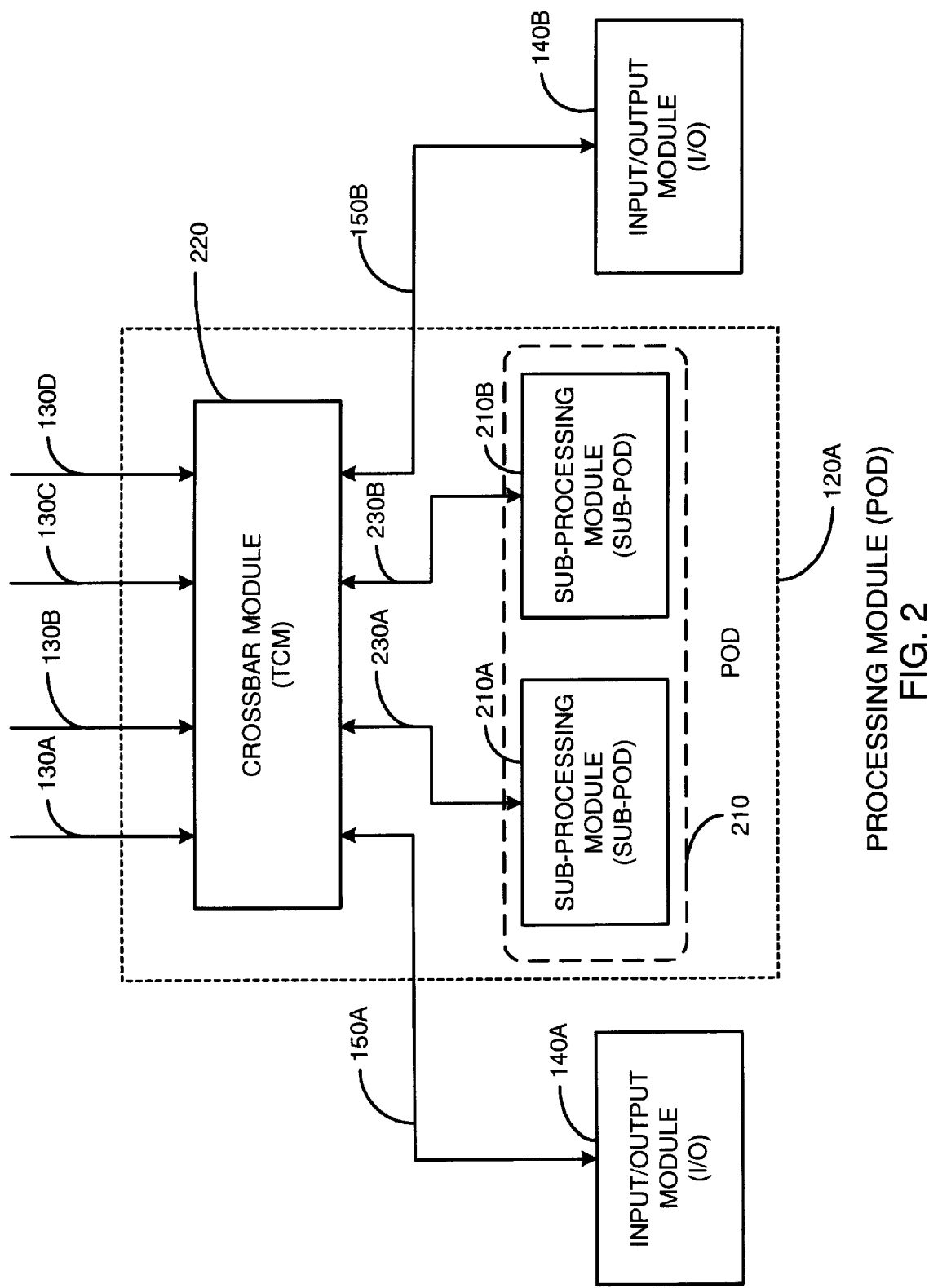
FIG. 2 is a block diagram of one embodiment of a processing module (POD)

FIG. 2 is a block diagram of one embodiment of a processing module (POD). POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Interfaces 230A and 230B, respectively, that are similar to the MI interconnections 130. TCM 220 further interconnects to one or more I/O Modules 140 via the respective point-to-point MIO Interfaces 150. TCM 220 buffers data, and functions as a switch between Interfaces 230A, 230B, 150A, and 150B, and MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. The TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems.

In one embodiment of the SMP environment, I/O Modules 140 are external to Sub-POD 210 as shown in FIG. 2. This embodiment allows system platform 100 to be configured based on the number of I/O devices used in a particular application. In another embodiment of the present invention, one or more I/O Modules 140 are incorporated into Sub-POD 210.

Figure 3:
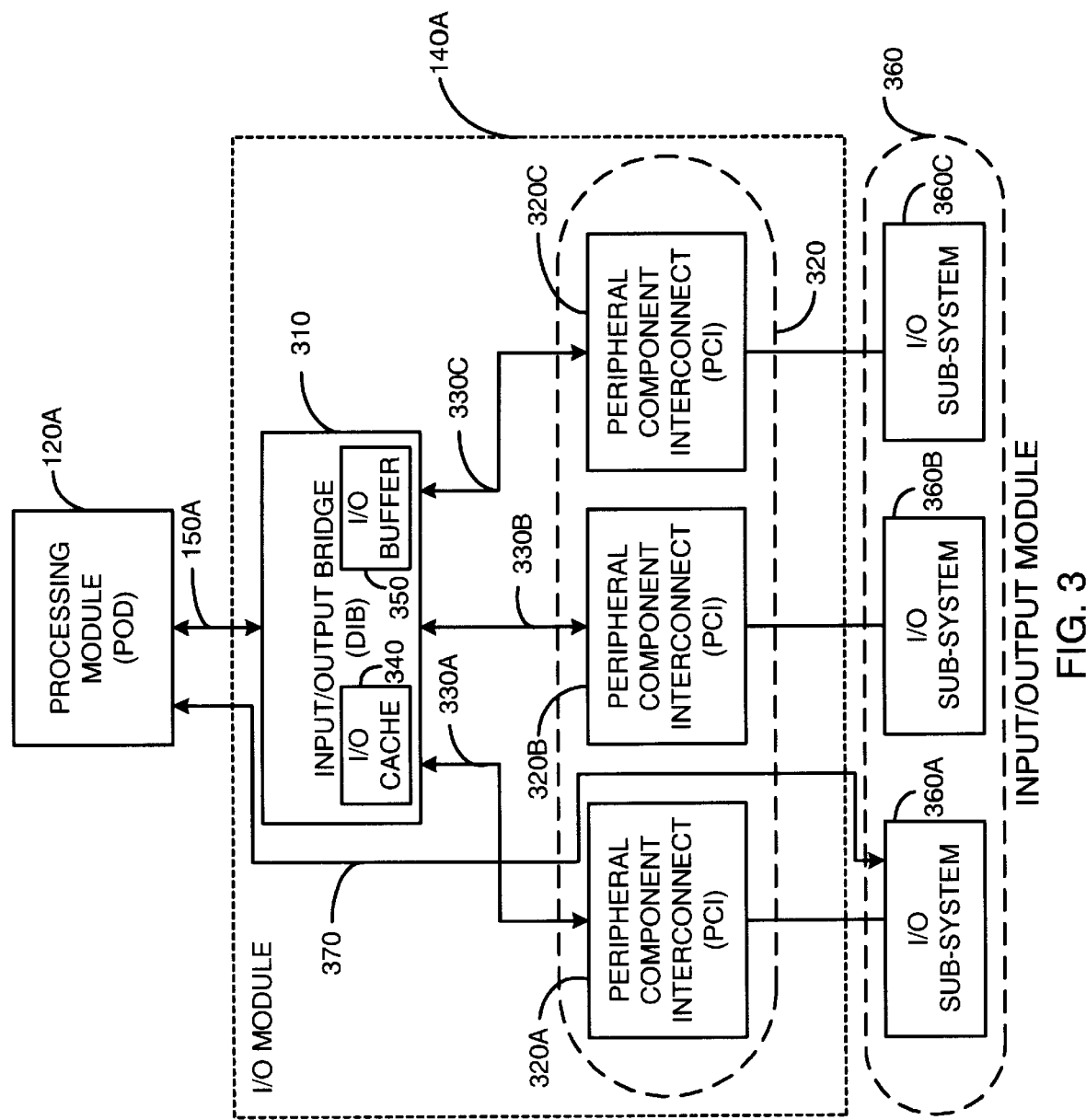
FIG. 3 is a block diagram of an I/O Module used in connection with the exemplary SMP system.

FIG. 3 is a block diagram of an I/O Module used in connection with the exemplary SMP system. I/O Module 140A and Processing Module 120A are illustrated, but it is understood that each I/O Module 140 has a similar structure and interconnection. I/O Module 140A includes a Direct Input/Output Bridge (DIB) 310 connected to one or more Peripheral Component Interconnects (PCIs) in dashed block 320, individually shown as PCI 320A, PCI 320B, and PCI 320C, via one or more dedicated PCI Interfaces 330, shown individually as PCI Interfaces 330A, 330B, and 330C, respectively. DIB 310 is also connected to POD 120A via MIO Interface 150A as is shown in FIG. 2. DIB 310 buffers data, and functions as a switch between PCI Interfaces 330A, 330B, and 330C and MIO Interface 150A, allowing POD 120A access to each of PCIs 320A, 320B, and 320C, respectively. The DIB includes I/O Cache 340 coupled to each of the PCIs in the associated DIB, and is used to buffer read-only data received from an MSU 110 for use by one or more of the various I/O devices associated with the PCIs. The DIB further include an I/O Buffer 350 used to buffer read/write data retrieved from an MSU 110 for the purposes of performing partial write operations. Together, I/O Cache 340 and I/O Buffer 350 may be referred to as I/O Memories. The functionality provided by these I/O memories will be described in more detail below.

Peripheral Component Interconnect (PCI) 320 represents a set of industry-standard PCI add-in cards, each of which connects multiple I/O Sub-systems in dashed block 360, individually shown as I/O Sub-systems 360A, 360B, and 360C, to I/O Module 140A via an industry-standard bus.

These I/O Sub-systems 360 include, but are not limited to, SCSI controllers, LAN controllers, and video controllers, and various other disk and tape sub-systems. Other I/O bussing architectures could similarly be used in connection with the SMP environment, and the particular I/O bussing architecture selected is not relevant to the cache coherency bypassing methodology of the present invention.

In operation, memory data can be retrieved from an MSU 110, and transferred via MIO Interface 150A to an I/O Sub-system 360 such as a tape or disk sub-unit so that a copy may be created. In this instance, it is not necessary to store the memory data in either the I/O Cache 340 or the I/O Buffer 350 as is indicated by Line 370.

Memory data may also be retrieved from an MSU 110 to be stored in I/O Cache 340. Data within I/O Cache 340 is available to the I/O Sub-units 360 through the associated PCIs 320 for read-only purposes. The I/O Cache reduces system overhead by reducing the number of read requests that must be presented to an MSU.

As stated above, one embodiment of the I/O Cache involves storing the data in the I/O Cache for read purposes only. When data is transferred from an I/O Module to be written to an MSU, one of two methods is utilized. When an entire contiguous block of data is to be written by an I/O Module to an MSU 110, the I/O Module performs an Overwrite operation. The contiguous data block is transferred from an I/O Sub-system such as disk directly to the MSU without being temporarily stored within an I/O Cache 340 or I/O Buffer 350 as is indicated by Line 370. The data provided by the I/O Module will overwrite whatever data signals previously were stored within the MSU. In other instances, the I/O Module is not overwriting an entire contiguous block of memory data but is instead merging data retrieved from an I/O Sub-system into selected addressable portions of a memory block. In these situations, an addressable block of memory data is copied from an MSU 110 to I/O Buffer 350. Data is then retrieved from I/O Sub-system 360 and selectively merged into I/O Buffer 350, and the entire addressable block of memory data is transferred back to the appropriate MSU. This is done so that an MSU is not forced to handle the merging process, which would diminish data throughput. One manner in which these various I/O operations are supported by the cache coherency system of the example memory system is discussed below.

Figure 4:
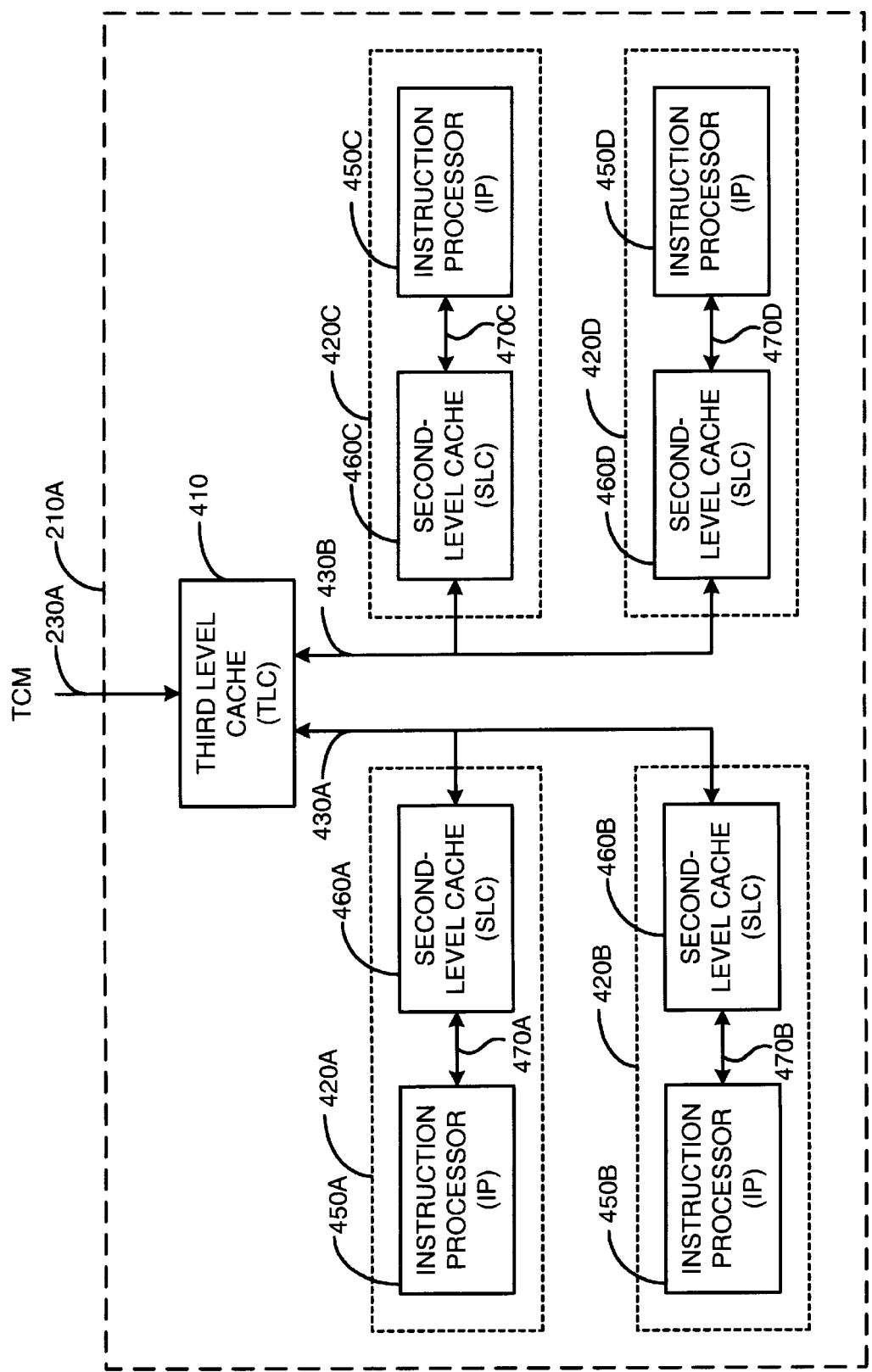
FIG. 4 is a block diagram of one example of a Sub-Processing Module (Sub-POD)

FIG. 4 is a block diagram of one example of a Sub-Processing Module (Sub-POD) 210A. Sub-POD 210A is shown, but it is understood that all Sub-PODs 210 have similar structures and interconnections. In this embodiment, Sub-POD 210A includes a Third-Level Cache (TLC) 410 and one or more Coherency Domains 420 (shown as Coherency Domains 420A, 420B, 420C, and 420D). TLC 410 is connected to Coherency Domains 420A and 420B via Bus 430A, and is connected to Coherency Domains 420C and 420D via Bus 430B. TLC 410 caches data from the MSU, and maintains data coherency among all of Coherency Domains 420, guaranteeing that each processor is always operating on the latest copy of the data.

Each Coherency Domain 420 includes an Instruction Processor (IP) 450 (shown as IPs 450A, 450B, 450C, and 450D), and a Second-Level Cache (SLC) 460 (shown as SLC 460A, 460B, 460C and 460D.) Each SLC interfaces to an IP via a respective point-to-point Interface 470 (shown as Interfaces 470A, 470B, 470C, and 470D), and each SLC further interfaces to the TLC via Bus 430 (shown as 430A and 430B.) For example, SLC 460A interfaces to IP 450A via Interface 470A and to TLC 410 via Bus 430A. Similarly, SLC 460C interfaces to IP 450C via Interface 470C and to TLC 410 via Bus 430B. Each SLC caches data from the TLC as requested by the interconnecting IP 450.

IP 450 and SLC 460 may be integrated in a single device, for example, such as a Pentium Pro® processing device available from the Intel Corporation. Alternatively, the IP 450 may be a A-Series Instruction Processor or a 2200-Series Instruction Processor, both commercially available from the Unisys Corporation. In this embodiment, the IP 450 is externally coupled to an SLC 460.

FIG. 5 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 contains Data Lines 510 (shown as 510A, 510E, 510J, and 510N) wherein each set of Data Lines 510 includes sixty-four bi-directional data bits, data parity bits, data strobe lines, and error signals (not individually shown.) Each set of Data Lines 510 is therefore capable of transferring eight bytes of data at one time. In one embodiment, a memory transfer operation involves eight eight-byte transfer operations over a respective set of Data Lines 510. Thus any transfer operation involves 64 bytes, which is termed one "cache line" of data.

Data Lines 510A, 510E, 510J, and 510N interface to the Memory Data Crossbar (MDA) 530. The MDA 530 buffers data received on Data Lines 510, and provides the switching mechanism that routes this data between the PODs 120 and an addressed location within the Data Storage Array 540 via Line 535. Data Storage Array 540, which is addressed in 64-byte cache lines discussed above, provides the main storage facility for SMP 100. For each of the cache lines stored in the Data Storage Array, associated status bits are stored in the Directory Storage Array 550. The status bits, referred to as the "Directory Storage Information Bits", records which IP(s) 450 or which IOP 140 has a copy of the associated cache line stored within a local cache memory. Whenever any read or write operation is performed to a cache line within the Data Storage Array 540, the Directory Storage Information Bits associated with that cache line are read from the Directory Storage Array 550. These bits are used to determine how the read or write operation should be processed. For example, these bits may indicate that the Data Storage Array may not contain the most recent copy of the requested cache line because a (possibly updated) copy of the cache line resides in a specified TLC 410. The memory operation will therefore be completed by retrieving this copy from the TLC, forcing the TLC to designate the copy as unusable (invalidate it), and providing the copy to the new requester. The Directory Storage Information Bits will be updated to reflect the newly created copy of the cache line.

Control for MSU 110A is provided by the Memory Controller (MCA) 560. MCA includes Request Logic 562 for queuing requests and associated commands from Address/command Lines 520 (shown as 520A, 520E, 520J, and 520N.) The commands are provided by the PODs 120 on behalf of the TLCs 410 and I/O Caches 340 to indicate what type of memory operations are to be performed. The queued requests and the associated commands are provided to Control Logic 564, which generates the routing control information for MDA 530 on Line 566. Control Logic 564 provides address signals to Directory Storage Array 550 and Data Storage Array 540 on Lines 570. Control signals are provided to Directory Storage Array 550 and Data Storage Array 540 on Lines 580 and 582, respectively. Control Logic 564 further provides Mask Signal 584 to Data Storage Array 540 to control which data signals transferred on Line 535 to the Data Storage Array are actually written to the Data Storage Array, as will be discussed further below.

MCA 560 further includes Directory State Control 568. During any read or write operation of a cache line stored in Data Storage Array 540, Directory State Control 568 retrieves the associated Directory State Information from the Directory Storage Array 550 across Lines 590. Directory State Control 568 then updates the Directory State Information based on the command associated with the memory request, and further based on the identity of the requesting unit. After this update is performed, the information is written back to the Directory Storage Array.

MCA 560 also includes Coherency Control 569. Coherency Control receives Directory Storage Information from Directory State Control 568. In response to this status information, Coherency Control 569 generates control signals to the Request Logic 562 causing Request Logic to issue Functions to one or more the PODs so that the in-progress memory operation may be completed in a manner which guarantees cache coherency. Using the example provided above, assume the Directory Storage Information Bits associated with the requested cache line indicate that the most recent copy of a requested cache line is located in a specified one of the TLCs. Coherency Control 569 receives this information from Directory State Control 568 and generates control signals to Request Logic 562. Request Logic issues the appropriate Function to the POD associated with the specified TLC, thereby causing the TLC to return the requested cache line in a manner to be described below.

Data coherency involves ensuring that each POD 120 operates on the latest copy of the data. Since multiple copies of the same data may exist within platform memory, including the copy in the MSU and additional copies in various I/O Caches 340 or Third Level Caches 410, some scheme is needed to control which data copy is considered the "latest" copy. The platform of the current invention uses a directory protocol to maintain data coherency. The directory protocol of the previously-described embodiment stores Directory Storage Information Bits for each of the cache lines stored in an MSU 110. This information is monitored and updated by the MCA 560 when a cache line is read or modified. The Directory Storage Information Bits includes information that indicates which "state" a cache line is in, and further indicates which TLC(s) or I/O Cache may have a copy of the cache line.

A cache line "state" provides information about what access privileges are associated with the cache line, and further indicates which actions need to be taken by the MSU and the rest of Platform 100 before a request concerning a particular cache line may be granted. For example, the cache line data may have to be retrieved from one of the TLC or I/O Caches. In other cases, copies of the cache line may have to be invalidated within one or more TLC or I/O Caches before the MSU can provide the request cache line to the requester.

In the exemplary system described above, a cache line is in one of the following states, including "MSU Owns", "Exclusive", "Shared", "I/O Copy", "I/O Exclusive", "Deferred", and "Error". All cache lines in the MSU are placed in the "MSU Owns" state after system initialization and before any cache lines have been copied into one of the system caches. This is also the state a cache line enters after it is overwritten with new data received from an I/O subsystem such as disk or tape during an "Overwrite" operation. This state indicates that the MSU has the most recent copy of the cache line. Since only the MSU is considered to have a valid copy of any cache line that is in the MSU Owns state, an error occurs if any of the TLCs or I/O Caches attempts to write to the cache line at this time.

A POD may make a request to an MSU to obtain ownership to modify a copy of a cache line. This request is made on behalf of a TLC 410 associated with that POD. When the TLC is provided with the requested cache line, the cache line transitions to the "Exclusive" state. The TLC receiving the cache line is said to be the "Owner" of that cache line, and has read/write access rights. Only one cache may be the Owner of a cache line at once. No other cache may have a copy of the cache line while another cache is the Owner. Once the cache line enters the Exclusive state, the copy of the cache line stored within the MSU is no longer considered valid. When the MSU receives requests for a cache line that is in the Exclusive State, the MSU must retrieve the cache line copy from the Owner during what is referred to as a "Return" operation. As will be described more fully below, the present invention is directed to at least partially bypassing this mandatory data "return", thereby reducing memory latencies.

A POD may also request a copy of a cache line for read-only purposes. When a cache line is copied to one of the TLCs for read-only purposes, the cache line state transitions to the "Shared" state. When in this state, the cache line may reside within one, several, or all of the TLCs 410 in Platform 100 at once. The MSU is still considered to have a valid copy of the cache, and may provide this cache line to a TLC making a further read-only request.

Another read-only state is the "I/O Copy" state. In the I/O Copy state, the cache line may reside within one I/O Cache 340 and no TLCs. As is the case with the Shared state, the MSU is still considered to have a valid copy of the cache line, and modifications may not occur to the cache line within the I/O Cache. The coherency actions employed when a cache line is in this state are similar to those used when the cache line is in the Shared state. This state is used to provide multiple I/O Sub-systems 360 coupled to I/O Cache 340 with access to MSU data for read-only purposes, thereby reducing the number of requests made to main memory, and I/O-to-memory access times.

The "I/O Exclusive" state allows an I/O Buffer 350 to gain an exclusive copy of the cache line with read/write access rights, thereby becoming the cache line Owner. When the cache line is in this state, no other copies may exist within any other cache in the system. Moreover, the Owner is not forced to return the cache line until it has completed the operation. That is, the MSU does not initiate the return of cache lines in this state as a result of subsequent requests by other units. Instead, the Owner returns the cache line on its own accord. This allows an I/O unit to receive a cache line from the MSU, selectively merge data received from a disk or tape sub-system into the cache line, then write the cache line back to main memory after all updates are completed without an MSU performing any coherency operations. This allows system overhead to be reduced in a manner to be described below.

A cache line may also be in the "Deferred" state, indicating that the cache line state is in transition. The Deferred state is entered when a request is made for a cache line that is either in the Exclusive or I/O Exclusive state. Since the MSU is not considered to have a valid copy of a cache line that is in either the Exclusive or I/O Exclusive states, the request is deferred until the Owner of the cache line returns access rights and/or the modified copy of the cache line to the MSU. Once the MSU issues a Function to the current Owner initiating the return of the cache line, the cache line must transition to this temporary state. Otherwise, the MSU will (erroneously) issue additional Functions to the current Owner if subsequent requests for this cache line are received before the return of the cache line is completed.

Finally, a cache line may also transition to the "Error" state. A cache line transitions to the Error state when the MSU receives an unexpected command. For example, if a cache line is in the MSU Owns state, the MSU should contain the only valid copy of the cache line within the Platform. Therefore, a command attempting to write the cache line from a cache to the MSU is considered an illegal and unexpected operation, and will cause the cache line to transition to the Error state. Once a cache line is in the Error state, it may not be accessed. It remains in the Error state until the MSU is re-initialized, or until an I/O Module 140 makes a request to write new data to the entire cache line during an I/O Overwrite operation.

Figure 6A:
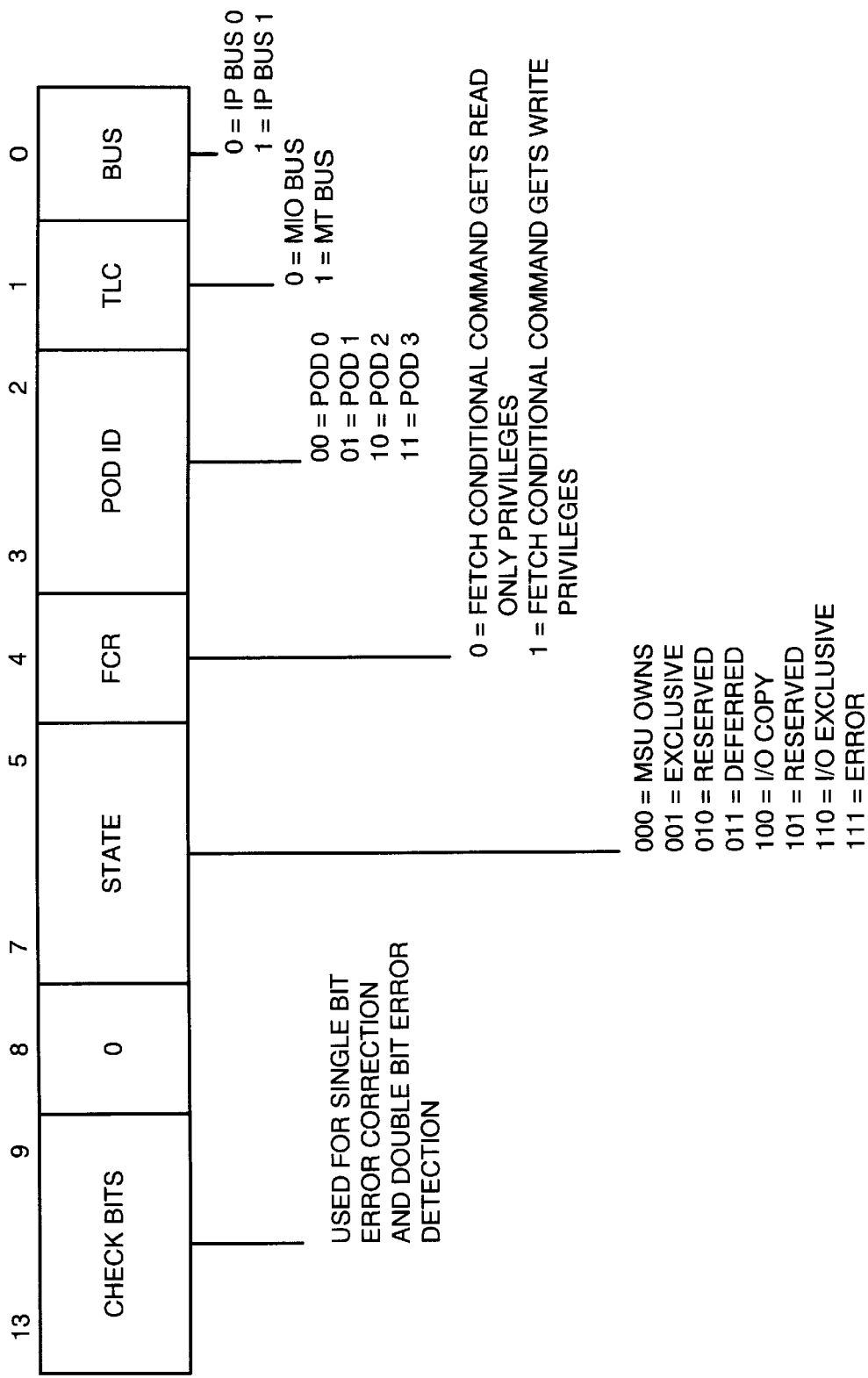

FIGS. 6A and 6B are Directory Storage Information Bit Formats used to encode the directory states described above. The Directory Storage Information Bits may be expressed in two formats. The Ownership Format, which is designated by setting Bit 8 to 0, is shown in FIG. 6A. This format is used whenever a cache line is in any state other than the Shared State. When described in Ownership Format, the cache line state is encoded in bits 7–5. Bits 3–0 encode the identity of a TLC or I/O Cache having a copy of the cache line. More specifically, bits 3–2 identify the POD associated with the cache. Bit 1 indicates whether the cache is coupled to a MIO Interface 150 (I/O Cache) or a MT Interface 230 (TLC). Finally, bit 0 identifies the cache as one of the two TLCs 410 or I/O Caches 340 associated with a given POD.

FIG. 6B is the format used to express Directory Storage Information Bits when the associated cache line is in the Shared State. This format, which is designated by setting bit 8 to one, identifies one or more TLC(s) having a shared copy of the cache line using a vector stored in bits 7–0.

In both the Ownership and Shared Formats illustrated in FIGS. 6A and 6B respectively, bits 13–9 store the check bits that provide single bit error correction and double-bit error detection on bits 8–0 of the Directory Storage Information Bits.

As discussed above, when a POD 120 makes a read request to an MSU 110 for a cache line, the MCA will read the associated Directory Storage Information Bits, update them according to the request, and write them back to the Directory Storage Array 550. The new state of the cache line depends both on the type of request, and the identity of the cache which will obtain a copy of the cache line. The type of request is determined by the "command" provided by the requesting POD 120 on predetermined Address/command Lines 520. The identity of the requesting cache is encoded on other Address/command Lines using an encoding scheme similar to that used within the Directory Storage Information Bits. As discussed above, when the MSU receives a command from one of the PODs, the MSU may respond by issuing a Function to one or more of the PODs to cause some action to occur with respect to the cache line so that cache line coherency will be maintained.

It should be noted that in one embodiment of the aforementioned SMP system, the PODs do not initiate the requests of their own accord. Each command is issued by a POD because of a request made by an associated TLC or an I/O Cache. Furthermore, although functions are said to be issued by the MSU to a POD, it should be understood that each of these functions are issued to solicit an action within a TLC or an I/O Cache associated with the POD. In other words, logic within the POD facilitates communications functions occurring between the MSU and the TLC and I/O Caches associated with the POD.

A POD issues five types of Commands to the MSU: Fetches, Stores, I/O Commands, Special Commands, and Diagnostic Commands. Fetches generally request that data from the MSU be provided to a TLC. Stores indicate that data and/or access rights are being returned to the MSU by a TLC. I/O Commands include Commands which are counterparts to the Fetches and Stores, but which request that a cache line be transferred from, or provided to, an I/O Cache. Diagnostic Commands are used to inject faults, and to perform verification functions. Special Commands include commands to send a message from one POD to another, which are used in connection with the present invention to allow the MSU to be bypassed in a data transfer.

Further, an MSU may have to obtain the latest copy of a cache line before a request may be granted. To obtain this latest copy, the MSU issues return-type functions including the Return-Copy, Return-Purge, and Return-Purge-No-Data Functions. These return-type functions cause a TLC to return cache line data and/or permission rights to the MSU. When the TLC responds to these functions, the data and/or permission rights are returned by the associated POD along with one of the Return Commands. Similarly, a POD issues an I/O Command when an I/O Module wants to read from, or write to, a cache line within an MSU 110.

The specific format and definition of general POD commands, I/O commands, and MSU return commands need not be fully described to understand the present invention, and therefore will not be described in full detail here. However, to obtain an appreciation of how such commands and return commands are encoded and issued, reference can be made to copending U.S. patent application, Ser. No. 09/001,598 entitled "Directory Based Cache Coherency System Supporting Multiple Instruction Processor and Input/Output Caches", filed on Dec. 31, 1997, which, as previously indicated, is incorporated herein by reference.

The aforementioned description of a cache coherency scheme used in connection with a directory-based memory system sets forth a computer memory environment in which the present invention is applicable. The following description of the present invention is described in terms of the above-described memory system for purposes of explanation and illustration. As will be apparent to those skilled in the art from the following description, the present invention is applicable in other cache coherency environments and is not to be limited to the specific embodiment set forth above.

As previously indicated, the present invention provides a bypass mechanism for use in maintaining memory coherency, such as cache coherency, in systems having a main memory as well as multiple local memories used in connection with corresponding processors, input/output devices, or other computing modules. The present invention avoids the need to return data from a current data owning computing module to the main memory prior to providing the data to the requesting computing module. Instead, a requesting module makes a request for data, and if another computing module other than the main memory is the current owner of the data, the data is directly provided to the requesting module. However, coherency must be maintained, and the present invention also provides a manner of maintaining local memory coherency. Therefore, the present invention significantly reduces memory latency for data transfers between computing modules, while maintaining local memory coherency.

While the more simple approach to maintaining cache coherency when a requesting POD requests ownership of a cache line currently owned by a second POD would be to force the cache line to be first returned to the main memory, this approach is time-consuming and adversely affects system performance. The present invention provides a mechanism and procedure for allowing the requested cache line to bypass the main memory and travel directly to the requesting POD, while also providing for the independent return of the cache line from the second POD to main memory in order to maintain cache coherency. In one embodiment of the invention, the only relationship between the return of the cache line to the main memory and the transfer of the requested cache line to the requesting POD is an enablement indication to allow the cache line to be returned to the main memory when the POD-to-POD data transfer has reached a predetermined stage of the transfer. However, while bypassing the main memory allows the requesting POD to obtain the requested data faster, it greatly complicates the coherency protocol. This complication results at least in part because the requesting POD may receive the data via the bypass path, update the data in its cache, and flush the data to memory, all before the time the data from the second POD (i.e., the POD having original ownership) ever makes its way back to the memory for coherency purposes. If the memory merely received the requests and processed them in the order received, it would overwrite the most recent data provided by the requesting POD with the outdated data from the second POD that originally owned the cache line. Therefore, the present invention also provides a tracking mechanism and methodology to ensure that memory is provided with the most recent copy of the data.

The aforementioned embodiment of the SMP system 100 exemplifies the type of computing environment in which the present invention is particularly useful. Although the present invention is particularly beneficial in such a system, and although a preferred embodiment of the present invention is situated within such an SMP system 100, the present invention is not limited thereto. The present invention is equally applicable in other computing environments having a designated module, such as a memory module, that maintains cache coherency in a multi-cache memory system. In the SMP 100 example, the main memory 110 includes directory storage for maintaining cache line ownership status. Other computing systems implementing memory ownership status where data is returned to the designated module and where the ownership status is updated therein prior to being forwarded to other requesting modules are equally appropriate environments to which the present invention is applicable and beneficial. The ensuing description describes the invention in general terms, and also sets forth the invention in terms of an SMP environment as previously described.

Figure 7:
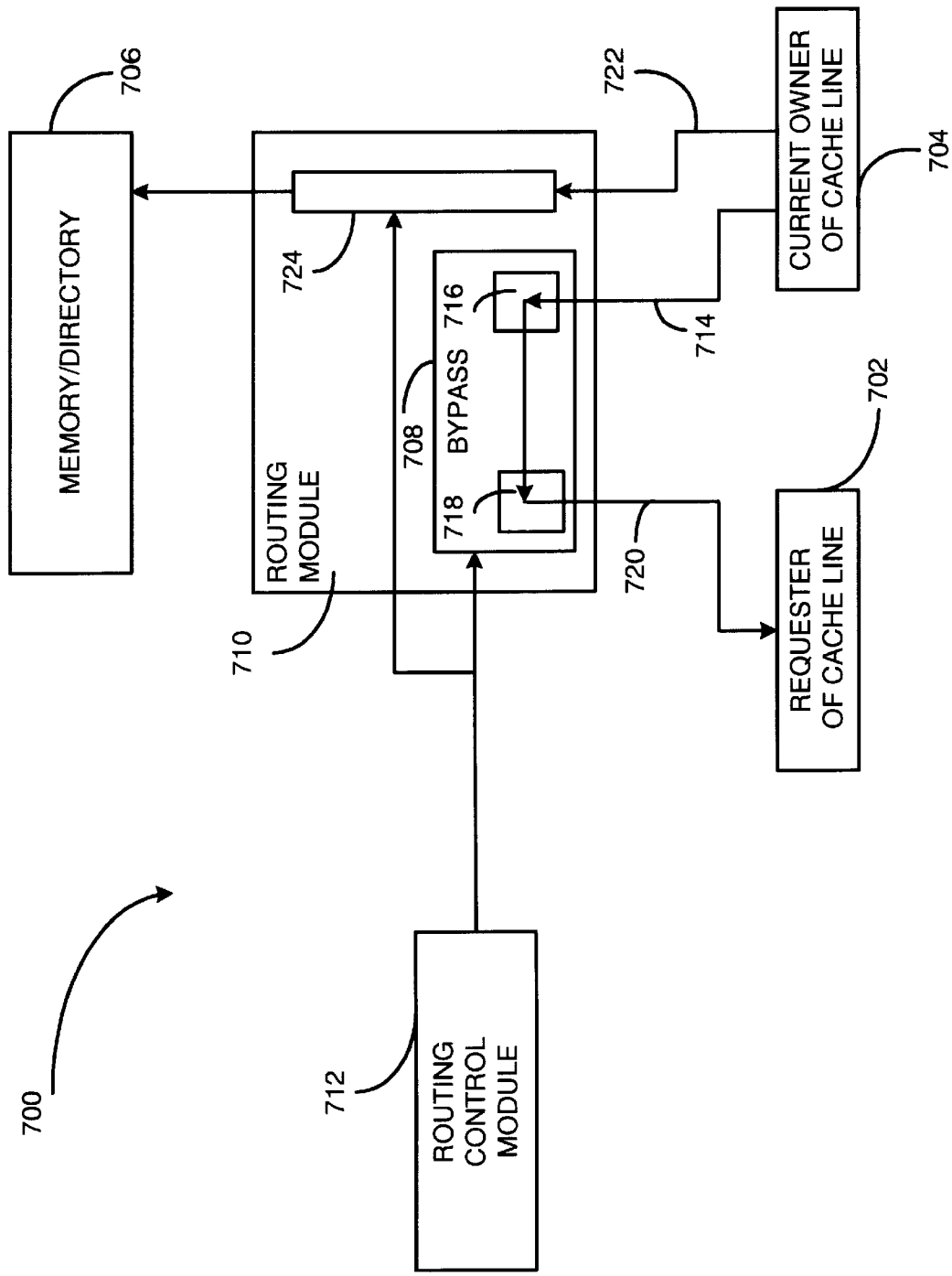
FIG. 7 is a block diagram of one embodiment of a bypass buffer mechanism in accordance with the present invention.

Referring now to FIG. 7, a block diagram of one embodiment of a bypass buffer mechanism 700 in accordance with the present invention is provided. The bypass buffer mechanism 700 includes a plurality of local memories, such as cache memories, within various components or modules of the system. For example, these local or cache memories may be associated with processing modules, input/output modules, directly-coupled peripheral devices, and the like. In FIG. 7, two such modules are represented as the Requester 702 of a cache line and the Current Owner 704 of the requested cache line. Both of these devices could be PODs 120 as previously described. Each POD has at least one associated cache memory, and in this case the Requester 702 is requesting a cache line currently "owned" by the Current Owner 704. The Current Owner 704 may "own" the requested cache line because it previously requested the cache line in question and made modifications to that cache line. In order to make such modifications, that device had to obtain ownership of the cache line to maintain cache coherency. The Memory/Directory module 706, analogous to the Data Storage Array 540 and Directory Storage Array 550, changed the ownership status to reflect that device 704 owns the cache line upon obtaining rights to modify it.

In prior art systems, a request by one device having a local memory for a data segment owned by another device would require that the data segment be transferred from the owning device to the memory (where ownership status is updated), and finally transferred to the requesting device. In prior art systems, the transfer of the data from the current owner to the memory may be referred to as a "Return" command, indicating that the modified data needed to be returned to the main memory before any other requesting device can obtain the data for modification or even to obtain a copy of the data. However, storing the data in the memory and updating the status prior to providing the data to the requesting device is very time-consuming, and negatively affects system performance.

The present invention greatly enhances system performance in such situations. A Bypass Module 708 is provided which works in connection with a Routing Module 710 to allow a cache line (or other locally-owned data segment) to bypass the requirement of first being stored in the Memory/Directory 706 prior to being provided to the Requester 702. The Bypass Module 708 is controlled by a Routing Control Module 712 that directs the requested cache line from the Current Owner 704 on interface 714 directly between Input Queue 716 and Output Queue 718, and on to the Requester 702 via interface 720.

However, cache coherency must be maintained. Therefore, the present invention provides another interface, represented by line 722, that provides the requested cache line back to the Memory/Directory 706 via normal routing channels. A Crossbar Interconnect Module 724 also controlled by the Routing Control Module 712 provides the requested cache line back to the appropriate memory location as if a standard Return function had been issued. This allows the Memory/Directory 706 to maintain cache coherency, but does not delay the Requester 702 from obtaining the cache line as quickly as possible.

Figure 8:
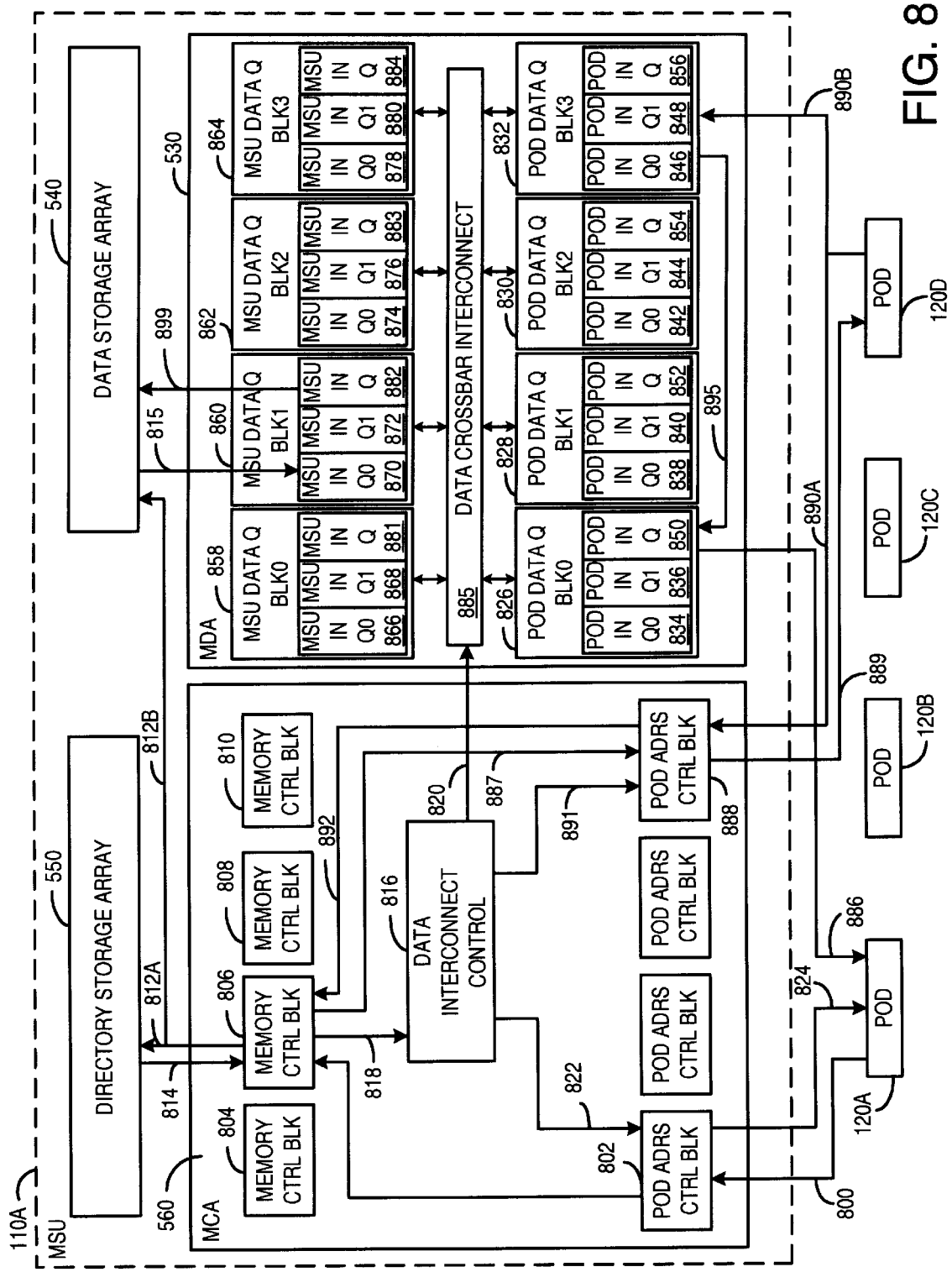
FIG. 8 is a block diagram of a more specific embodiment of a bypass buffer mechanism within a multi-processor transaction processing system.

FIG. 8 is a block diagram of a more specific embodiment of a bypass buffer mechanism within a multi-processor transaction processing system. The embodiment of FIG. 8 is described in connection with a transaction processing system such as the SMP system described in connection with FIGS. 1–6, and uses like reference numbers where applicable for major components. For example, the example of FIG. 8 references PODS 120A, 120B, 120C and 120D, MSU 110A, MDA 530, Data Storage Array 540, Directory Storage Array 550, and MCA 560 in order to assist in an understanding of the operability of the present invention within the SMP environment previously described.

FIG. 8 is best described by example. A processor associated with a POD, for example POD 120A, issues a Fetch Command on interface 800. The Fetch Command includes a memory address, identification of the requesting POD, and detailed command code. The Fetch Command reaches POD Address Control Block 802 within the MCA 560, which includes a queuing structure for such data transfer requests. The POD Address Control Block 802 determines the destination Memory Cluster Control Block (804, 806, 808, 810) to which the Fetch Command is destined, based on the memory address information. When the Fetch Command in POD ADRS CTRL BLK 802 is scheduled for release from the queuing structure, the Fetch Command is transferred to the appropriate control block on the memory side of the MCA 560, which in this example will be assumed to be Memory Control Block 806, which also includes queuing structures for data transfer requests. The Memory Control Block 806 queuing structures schedules the Fetch Command for further processing based on other pending requests that it has in its queuing structures. When the Fetch Command gains priority in the queuing structure, it is provided to the Directory Storage Array 550 and the Data Storage Array 540 as shown on interfaces 812A and 812B respectively. In other words, when the Fetch Command gains priority it causes a main storage read cycle. Ownership status (i.e., directory state information) is read into the Memory Control block 806 on interface 814, where it is determined whether the requested cache line is owned by the main storage or some other device. This determination is analogous to the previously described Directory State Control 568 previously described in connection with FIG. 5. The Memory Control Block 806 retrieves the associated Directory State Information from the Directory Storage Array 550 across Lines 814, and then updates the Directory State Information based on the command associated with the memory request and on the identity of the requesting unit. A cache line is read from the Data Storage Array 540 and placed into one of the two MSU IN Qs, such as illustrated on line 815.

If the ownership status determination function of the Memory Control Block 806 determines that the requested cache line is owned by the main memory (i.e., the Data Storage Array 540), then it issues a read data transfer request to the Data Interconnect Control 816 via interface line 818. In this case, the Memory Control Block 806 schedules the read data transfer request for further processing based on other pending requests for data transfers that are currently in its queue. When the read data transfer request gains priority, the Memory Control Block 806 issues control signals to the MDA 530 via control interface 820 (shown in the embodiment of FIG. 5 as interface 566), which causes the transfer of read data from the appropriate MSU Input Queue (MSU IN Q0, MSU IN Q1) to the appropriate POD Output Queue (POD OUT Q). Also, the Data Interconnect Control 816 signals the data response output queue on the appropriate POD Address Control Block (802) that a data response signal for the requested fetch can be transmitted to the POD 120A as shown by interface 822.

As mentioned above, the control signals on control interface 820 cause the transfer of read data from an appropriate MSU Input Queue to the appropriate POD Output Queue in cases where the Memory Control Block 806 determines that the requested cache line is owned by the main memory. The following description explains the manner in which data is transferred in the MDA in response to the control signals on control interface 820 in accordance with one embodiment of the invention.

In this example it is assumed that the computing environment includes four Processing Modules (PODs), and the Data Storage Array 540 is divided into four individual Memory Clusters (MCL) in each MSU to which data resides. Multiple MCLs (not shown) allow for address and data interleaving, thereby allowing multiple memory operations to be performed substantially concurrently. In one embodiment, each MCL includes arrays of Synchronous Dynamic Random Access memory (SDRAM) devices and associated drivers and transceivers. It should be noted that the MSU may be populated with as few as one MCL if the user so desires. However, in the present example, it will be assumed that the Data Storage Array 540 includes four individual MCLs. With this configuration, each MDA will include four POD Data Queue Blocks and four MSU Data Queue Blocks. From the description provided herein, it will be readily apparent to those skilled in the art that the number of POD Data Queue Blocks and MSU Data Queue Blocks is dependent upon the number of PODs and MCLs desired in a particular computing environment. However, the principles described herein are equally applicable to any desired configuration.

Referring to FIG. 8, each POD Data Queue Block 826, 828, 830, 832 includes two input queues, labeled POD IN Q0 and POD IN Q1. For example, POD Data Queue Block 826 includes POD IN Q0 834 and POD IN Q1 836. POD Data Queue Block 828 includes POD IN Q0 838 and POD IN Q1 840. POD Data Queue Block 830 includes POD IN Q0 842 and POD IN Q1 844, and POD Data Queue Block 832 includes POD IN Q0 846 and POD IN Q1 848. Each of these POD input queues is for receiving data from its respective POD. While each POD Data Queue Block in the illustrated embodiment includes two input queues, the present invention is equally applicable to embodiments including only one input queue per POD Data Queue Block or more than two input queues per POD Data Queue Block.

Each POD Data Queue Block 826, 828, 830, 832 also includes one output queue, labeled POD OUT Q. For example, POD Data Queue Block 826 includes POD OUT Q 850, POD Data Queue Block 828 includes POD OUT Q 852, POD Data Queue Block 830 includes POD OUT Q 854, and POD Data Queue Block 832 includes POD OUT Q 856. Each of these POD output queues is for providing data to the respective POD. In the illustrated embodiment, data stored in a POD output queue is received from one of at least two sources, including from a POD input queue which occurs in the case of a POD-to-POD data transfer, or from an MSU input queue which is discussed more fully below.

The MDA 530 in FIG. 8 also illustrates that a plurality of MSU Data Queue Blocks 858, 860, 862 and 864 are present in the MDA 530. Each MSU Data Queue Block 858, 860, 862, 864 includes two MSU input queues, labeled MSU IN Q0 and MSU IN Q1. More specifically, MSU Data Queue Block 858 includes MSU IN Q0 866 and MSU IN Q1 868, MSU Data Queue Block 860 includes MSU IN Q0 870 and MSU IN Q1 872, MSU Data Queue Block 862 includes MSU IN Q0 874 and MSU IN Q1 876, and MSU Data Queue Block 864 includes MSU IN Q0 878 and MSU IN Q1 880. Each of the MSU input queues is for receiving data from the main storage to be transferred to a POD output queue in a POD Data Queue Block 826, 828, 830, 832. Each MSU Data Queue Block 858, 860, 862, 864 also includes an MSU output queue, labeled MSU OUT Q. More specifically, MSU Data Queue Block 858 includes MSU OUT Q 881, MSU Data Queue Block 860 includes MSU OUT Q 882, MSU Data Queue Block 862 includes MSU OUT Q 883, and MSU Data Queue Block 864 includes MSU OUT Q 884. Each MSU output queue is for receiving data signals from one of the POD input queues which is to be written to the main storage.

The data flow from POD to MSU is initiated by a POD, which provides data to its respective POD input queue destined for an MSU output queue and ultimately to an MCL in the Data Storage Array 540. The data flow from MSU to POD is initiated by an MCL, which provides data to its respective MSU input queue destined for a POD output queue for ultimate transmission to the targeted POD. The data transfer of the MDA 530 can be visualized as sixteen data sources (eight POD input queues and eight MSU input queues) vying for access to eight data destinations (four POD output queues and four MSU output queues). This interconnect is accomplished using the Data Crossbar Interconnect 885. The Data Crossbar Interconnect 885 is capable of connecting any of the POD input queues (834, 836, 838, 840, 842, 844, 846, 848) to any of the MSU output queues (881, 882, 883, 884), and also to any of the POD output queues (850, 852, 854, 856) in the case of a POD-to-POD data transfer. The Data Crossbar Interconnect 885 establishes a proper interconnection under the direction provided by the control signals on control interface 820. These interconnect control signals are at least in part based on the target address corresponding to the data to be transferred.

Therefore, where the Memory Control Block 806 determines that the requested cache line is owned by the main memory, the requested data is transferred from an MSU Data Queue Block (858, 860, 862, 864) to a POD Data Queue Block (826, 828, 830, 832). The POD Address Control Block 802 then schedules the transfer of a data response signal along with the requested data on interfaces 824 and 886 respectively. At this point, the Fetch Command where the MSU was the owner of the requested cache line has been completed.

If, however, the ownership status determination function of the Memory Control Block 806 determines that the requested cache line is owned by another POD, such as POD 120D, then POD 120D has the latest copy of the data. In this case, POD 120D must release the cache line from its cache, and relinquish ownership of the cache line. Under these circumstances, the Memory Control Block 806 retains the Fetch Command and marks its directory state as "Deferred", which indicates that it is waiting for further processing to be resolved.

Because the Memory Control Block 806 determined that another requester owns the data, it initiates a function on interface 887 to the appropriate POD Address Control Block based on the POD identification of the owner, which in this example is POD Address Control Block 888. The function includes the MSU address and detailed command code. In this case, the detailed command code would indicate "Return", which directs the owning POD 120D to return the requested data that is currently residing in its cache. While a Return function typically causes the requested data to be provided only to an addressed portion of the main memory, such a Return function in the present invention causes the owning POD to surrender the requested data, but the requested data is intercepted on its return route to accomplish the POD-to-POD transfer. Other detailed command code types that the MSU might send to a POD include "Purge", which directs a POD to invalidate a cache line copy that it currently holds in its cache. The Return function information supplied by the Memory Control Block 806 also includes data response signal information that is saved in the POD Address Control Block 888, and used to supply the data response signals to the destination POD at a later time, when the data is returned by the current owner—POD 120D.

The POD Address Control Block 888 schedules the return function for further processing based on other pending return and purge functions that it is currently managing. It uniquely identifies each particular return function with an identifier, referred to as a Memory Job Number (MJN). The MJN accompanies the MSU address and detailed command information. The MSU address will direct the surrendered data to the appropriate location in the main memory, although this surrendered data will also be intercepted in order to provide a direct POD-to-POD data transfer as is described more fully below.

The POD Address Control Block 888 then schedules the transfer of the return function to the POD 120D via interface 889, based on the current state of the address/command bus associated with interface 889, which was generally shown as part of Address/Command Lines 520N in FIG. 5. The management of data transfers across the POD/MSU bus 130 (see FIG. 1) may be determined in a manner described herein and in copending U.S. patent application, Ser. No. 09/096,624 entitled "Bi-Directional Interface Distributed Control Mechanism", filed on Jun. 12, 1998, which is assigned to the assignee of the instant application, the contents of which are incorporated herein by reference. The MSU 110A then awaits the return of the requested data from POD 120D.

The POD 120D eventually receives the return function via interface 889, and returns the requested data using both command and data interfaces, labeled interface 890A and 890B respectively. The detailed command code in the returned POD command indicates a "Store Return" type, and the unique MJN identifier is included in this POD command for future identification purposes. The command information is returned to the POD Address Control Block 888 and the data is provided to the MDA 530 via interface 890B. In this particular example, the data is returned from POD 120D to the POD Data Queue Block3 832 to the POD Input Queue-0 846.

The POD Address Control Block 888 receives the POD Store Return command and accesses information stored within the POD Address Control Block 888 that was earlier saved. This saved information includes data response signal information used to supply the data response signals to the destination POD. This saved information is located within the POD Address Control Block 888 using the unique MJN previously created by the POD Address Control Block 888 and returned to the POD Address Control Block 888 along with the Store Return command. The saved information in the POD Address Control Block 888 includes an identification of the requesting POD that is awaiting the returned data, as well as the data response signals to transmit back to the requesting POD 120A. The POD Address Control Block 888 lines up or correlates the Store Return command with its associated inbound data transfer. Such a "correlation" matches data and address signals associated with the same request, and may be determined in a manner described herein and in copending U.S. patent application, Ser. No. 09/096,822 entitled "Queueing Architecture And Control System For Data Processing System Having Independently-Operative Data And Address Interfaces", filed on Jun. 12, 1998, which is assigned to the assignee of the instant application, the contents of which are incorporated herein by reference.

When both the command and data components of the Store Return command are present, the Store Return is enabled for further processing. The POD Address Control Block 888 schedules the Store Return command for delivery to the Data Interconnect Control 816 based on other pending requests that it is processing in its request queue. Upon the Store Return command gaining priority in the queue, the POD Address Control Block 888 delivers the Store Return command to the Data Interconnect Control 816 via interface 891, and further retains the Store Return command to deliver back to the Memory Control Block 806 at a later time in order to update the main storage data and directory state.

The Data Interconnect Control 816 receives the Store Return command and schedules the return data transfer request for further processing based on other pending requests for data transfers that it is currently managing. When the return data transfer request identified by the Store Return command gains priority, the Data Interconnect Control 816 issues control signals to the MDA(s) 530 via control interface 820 to cause the transfer of the returned data from the appropriate POD Input Queue, which in this case is POD Input Queue-0 846, to the destination POD Output Queue, which in this case is POD Output Queue 850, via data interface 895. Also, the Data Interconnect Control 816 signals the data response output queue of the destination POD Address Control Block 802 via interface 822 that a data response signal to the requested fetch command can be transmitted to the requesting POD 120A. Additionally, the Data Interconnect Control 816 communicates to the POD Address Control Block that was the source of the Store Return command (POD Address Control Block 888 in this example) that this unique data return has been delivered to an output queue in the MDA 530, using the corresponding Memory Job Number (MJN).

The destination POD Address Control Block (POD Address Control Block 802 in this example) schedules the transfer of the data response signal plus the actual requested data across the POD/MSU interface 130. In the example of FIG. 8, this is accomplished by transferring the data response signal from POD Address Control Block 802 to POD 120A via interface 824, and by transferring the requested data from POD Output Queue 850 of POD Data Queue Block-0 826 to POD 120A via data interface 886. The original Fetch Command has now been satisfied by the MSU 110A, and the POD-to-POD data transfer is complete.

However, cache coherency must be maintained by properly updating the cache line ownership status in the Directory Storage Array 550 and returning the data to the Data Storage Array 540. Therefore, the POD Address Control Block 888 locates the original Store Return command in its input request queue and marks the Store Return command for delivery to the appropriate Memory Control Block (Memory Control Block 806 in this example). In a preferred embodiment, these activities take place in parallel with certain activities related to the transfer of the requested data to the requesting POD. For example, the activities surrounding the return of the Store Return command to the Directory Storage Array 550 and Data Storage Array 540 can be initiated during the time that the POD Address Control Block 802 is scheduling the transfer of the data and the data response signal to the requesting POD 120A. These parallel activities increase overall system performance.

As previously indicated, when the Memory Control Block 806 originally initiated the Return Function to the POD Address Control Block 888, the POD Address Control Block 888 saved the information therein. Therefore, when the POD Address Control Block 888 has located the original Store Return command in its input request queue and has marked the Store Return command for delivery to Memory Control Block 806, the POD Address Control Block 888 uses the MJN to invalidate that original return function entry so that the MJN is now available for a new return function. The Store Return command is delivered via interface 892 to the Memory Control Block 806 based on priority scheduling of other requests currently being managed by the POD Address Control Block 888 queuing circuitry.

The Memory Control Block 806 then receives the Store Return command and locates the original Fetch Command it is holding that was earlier marked as "Deferred". The Store Return command indicates that the Fetch Command has now been satisfied so that the Memory Control Block 806 can now schedule the writing of the returned data back to the Data Storage Array 540 via interface 899 and marking the current directory state of the cache line(s) in the Directory Storage Array 550 to reflect that POD 120A is the new "owner" of the respective cache line(s). The directory state of the cache line will change from "Deferred" to "Exclusive" in this example, and this directory state change will mark the completion of the POD-to-POD data transfer transaction.

The activities surrounding the return of the data to the Directory Storage Array 550 and the Data Storage Array 540 occur independently of the activities surrounding the transfer of the requested data to the requesting POD 120A. In other words, by the time the Directory Storage Array 550 and the Data Storage Array 540 receive the returned data and log the ownership change, POD 120A will have already received the requested data for its use. Therefore, not only does POD 120A typically receive the data prior to the returned data reaching the directory and main data storage, POD 120A does not have to wait for a data transfer from the main data storage back to POD 120A as in the prior art. The timing is of course dependent on the state of the queuing structures throughout the system, but on average this results in a substantial reduction in the time required for the requesting device to receive the requested data. For example, disregarding queuing delays throughout the various command and data transfer paths, the performance increase using the bypass acceleration mechanism and method of the present invention can be illustrated by comparing the number of clock cycles required to perform a POD-to-POD transfer with and without the benefit of the present invention. In the following example, the MSU clock cycles are measured from the first clock cycle of the POD Store Return command transmission at the owning POD output (e.g., POD 120D) to the first clock cycle of actual data transmission to the requesting POD (e.g., POD 120A). This comparison calculated in connection with an embodiment such as described in connection with FIG. 8 is illustrated in Table 1 below for a POD-to-POD transfer:

TABLE 1

| | Number of Clock Cycles |
| --- | --- |
| Without Bypass Mechanism Of Present Invention | 40 |
| With Bypass Mechanism Of Present Invention | 7 |

As can be seen, in the case where the bypass mechanism of the present invention is not employed and the returned data must first be written to main storage and then retrieved from main storage to be provided to the requesting device, approximately 40 clock cycles occur by the time the actual data transmission is initiated. Alternatively, using the present invention, this is reduced to 7 clock cycles, which is a substantial increase in performance. Again, this example does not account for queuing delays, but illustrates the relative difference of time required to perform a POD-to-POD transfer when implementing or not implementing the present invention.

Figure 9:
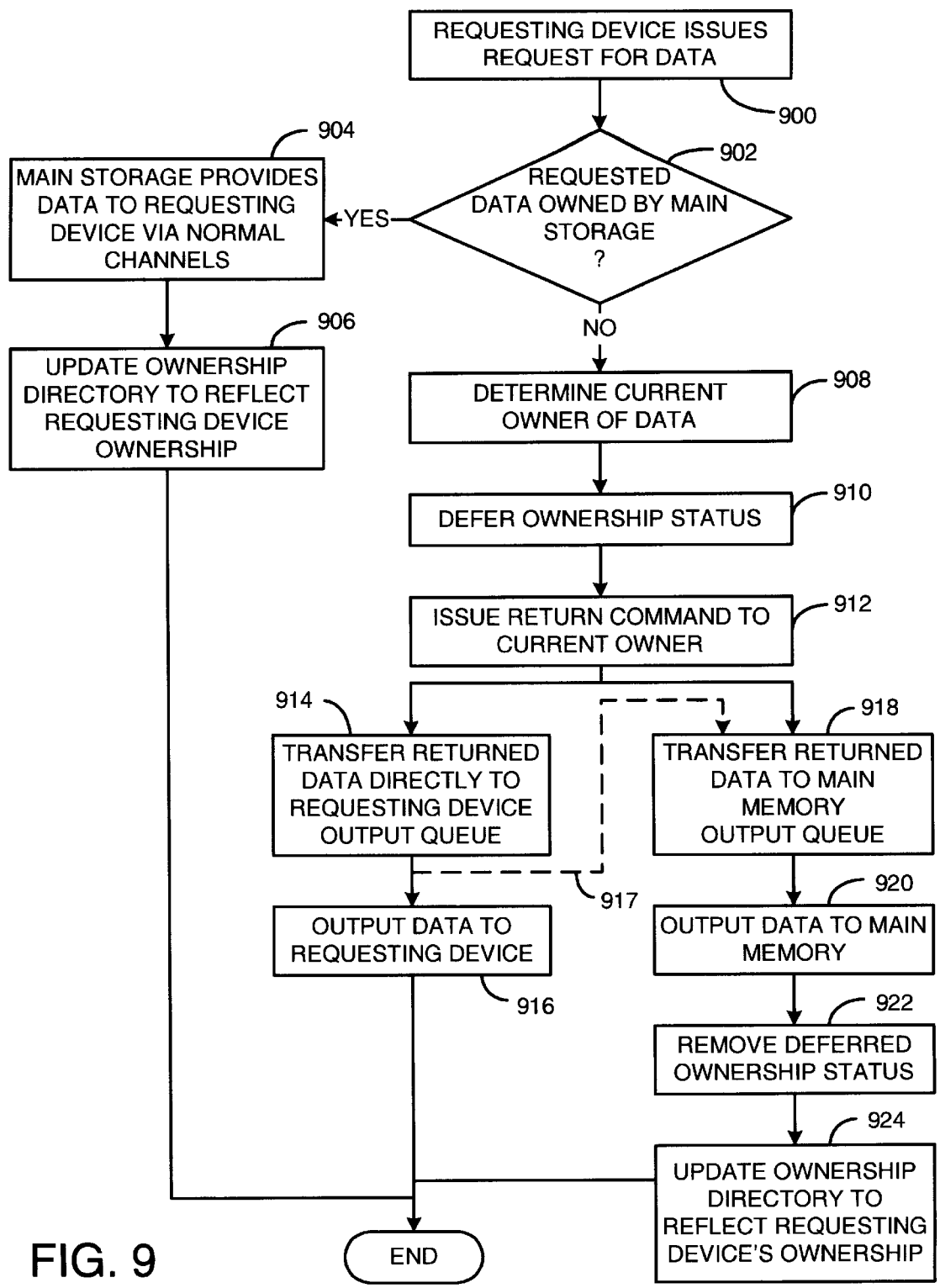
FIG. 9 is a flow diagram of a bypass buffer methodology in accordance with one embodiment of the present invention.

FIG. 9 is a flow diagram of a bypass buffer methodology in accordance with one embodiment of the present invention. A requesting device issues a request for data as shown at block 900. This request may be in the form of a Fetch Command or other command which would typically require a change of data segment (e.g., cache line) ownership. It is determined 902 whether the requested data segment is currently owned by main storage. If the requested data segment is owned by the main storage, the main storage provides the data segment to the requesting device via normal channels, as seen at block 904. For example, the data segment is transferred between main memory queuing structures and requesting device queuing structures via a data transfer module such as the Data Crossbar Interconnect 885 shown in FIG. 8, and the data segment is subsequently transferred to the requesting device. The ownership directory is updated 906 to reflect new ownership by the requesting device, and the transaction is complete.

If, as determined at block 902, the requested data segment is not owned by the main storage, the current owner of the data segment is determined 908. It should be noted that the determination of the current owner of the data segment at block 908 and the determination of whether the main storage owns the data segment at block 902 can be performed coterminously, and need not be performed in a sequence suggested by the flow diagram of FIG. 9.

The determination of the current owner of the data will provide an identification of a POD, I/O module, or other module currently owning the requested data segment. It should be recognized that in one embodiment of the invention, each POD includes multiple (e.g., two) processors each having an associated cache. Therefore, a data segment can actually be owned by the same POD requesting the data segment, but the current owner of the data segment would be a non-requesting processor within the POD. The ownership status at the ownership directory will be set to a "deferred" state as indicated at block 910, which indicates that the cache line state is in transition. A "Return" command is issued 912 to the current owner of the data segment to obtain the data segment.

At this time, the data segment is directly transferred 914 to the requesting device's output queue, and thereafter is output 916 to the requesting device. By providing the returned data directly to the input queue of the requesting device, the requesting device does not have to wait the time it would take to transfer the data back to the main storage, and then back to the requesting device's output queue.

In order to maintain cache coherency, the returned data segment is also transferred 918 to the main memory output queue. So, although the data will be returned to the main storage to maintain cache coherency, the requesting device was not forced to wait until all of this processing occurred. The embodiment of FIG. 9 illustrates the parallel and independent nature of the returned data segment as compared to the transfer 914 of the data to the requesting device. However, in one embodiment of the invention, the transfer 914 occurs first, and the transfer 918 is triggered after the data has been transferred 914 to the requesting device output queue, as indicated by dashed line 917. From the main memory output queue the data segment is output 920 to the main memory. The deferred ownership status is then removed 922, and the ownership directory is updated 924 to reflect that the requesting device is now the new owner of the data segment or cache line.

In one embodiment of the invention, the transfer of the returned data to the main storage for purposes of maintaining cache coherency occurs concurrently with the transfer of the returned data to the requesting device. However, the transfer of the returned data could alternatively be transferred after the data segment was provided to the requesting device without departing from the scope and spirit of the invention. As long as the ownership status is defined in the "Deferred" state until the returned data reaches the main memory, coherency will be maintained. However, performing these two operations in parallel further increases system throughput and overall system performance.

It should also be noted that the transfer 918 of the returned data to the main memory output queue is required where the associated data transfer request is one where ownership privileges, such as data write privileges, are desired. In these cases, the data must be removed from the current owner of the data, and output 920 to the main memory along with modifying the ownership status 922, 924. However, in cases where the data transfer request is only for a read-only copy of the data segment, ownership by the requesting device is not necessary. Ownership is still updated to designate the main memory the owner of the requested data, but in this case the device can retain a copy of the requested data that is being provided to the requesting device and a read-only copy of the requested data is provided to the requesting device. The "Shared" state previously described is an example of such a situation, where the requested cache line may reside within one, several, or all of the local memories at once. The MSU is still considered to have a valid copy of the cache, and may provide this cache line to a local memory making a further read-only request.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for performing a direct data transfer from a first device having a requested data segment stored in a first local memory to a second device having a second local memory, the method for use in a transaction processing system having a main memory to provide supervisory storage capability for the transaction processing system, the transaction processing system further having a directory storage for maintaining ownership status of each data segment of the main memory, the method comprising:

requesting a data transfer of the requested data segment in the first local memory to the second local memory of the second device;

transferring the requested data segment from the first local memory to the second local memory of the second device in response to the data transfer request;

transferring the requested data segment to the main memory and the directory storage to revise the ownership status to reflect a change of ownership from the first device to the second device; and wherein the requested data segment is transferred to the second local memory independent of the transfer of the requested data segment to the main memory and directory storage.

2. The method of claim 1, further comprising determining the ownership status of the requested data segment by accessing one or more ownership status bits corresponding to the requested data segment from the directory storage, and allowing a direct transfer of the requested data segment from the first device to the second device where the one or more ownership bits establish the first device as the current owner of the requested data segment.

3. The method of claim 1, wherein transferring the requested data segment from the first local memory to the second local memory comprises removing the data from the first local memory if the data transfer request indicates a command where ownership privileges are required by the second device.

4. The method of claim 3, further comprising:

determining the ownership status of the requested data segment by accessing one or more ownership status bits corresponding to the requested data segment from the directory storage;

allowing a direct transfer of the requested data segment from the first device to the second device where the one or more ownership bits establish the first device as the current owner of the requested data segment;

setting the ownership status of the requested data segment to a pending state until the requested data segment has been transferred to the main memory and directory storage; and revising the ownership status to reflect ownership by the second device when the requested data segment has been transferred to the main memory and directory storage.

5. The method of claim 1, wherein transferring the requested data segment from the first local memory to the second local memory comprises transferring a copy of the data from the first local memory to the second local memory and retaining the data in the first local memory if the data transfer request indicates a command where ownership privileges are not required by the second device.

6. The method of claim 5, further comprising:

determining the ownership status of the requested data segment by accessing one or more ownership status bits corresponding to the requested data segment from the directory storage;

allowing a direct transfer of the requested data segment from the first device to the second device where the one or more ownership bits establish the first device as the current owner of the requested data segment;

setting the ownership status of the requested data segment to a pending state until the requested data segment has been transferred to the main memory and directory storage; and revising the ownership status to reflect ownership by the main memory when the requested data segment has been transferred to the main memory and directory storage.

7. The method of claim 1, wherein transferring the requested data segment to the second device and transferring the requested data segment to the main memory and directory storage comprises performing the transfers in parallel.

8. The method of claim 1, wherein transferring the requested data segment to the main memory and directory storage comprises controlling the transfer of the requested data segment to the main memory and directory storage independent of the control of the transfer of the requested data segment to the second device.

9. The method of claim 1, wherein at least a portion of a data transfer path of the requested data segment to the second device is separate and distinct from a data transfer path of the requested data segment to the main memory and directory storage.

10. The method of claim 1, further comprising generating a data return command to direct the first device to surrender the requested data segment from the first local memory in response to the data transfer request.

11. The method of claim 1, wherein transferring the requested data segment from the first local memory to the second local memory comprises transferring the requested data segment from the first local memory to a temporary storage location prior to transferring the requested data segment to the second local memory.

12. The method of claim 11, wherein transferring the requested data segment to the second local memory of the second device comprises transferring the requested data segment from the temporary storage location to an output queue designated to output data to the second local memory.

13. The method of claim 12, wherein transferring the requested data segment from the first local memory to a temporary storage location further comprises transferring the requested data segment from the first local memory to an input queue designated to receive data from the first local memory.

14. The method of claim 1, wherein requesting a data transfer comprises issuing a data fetch command from the second device for processing by the transaction processing system.

15. The method of claim 1, wherein:

transferring the requested data segment from the first local memory to the second local memory comprises transferring the requested data segment from the first local memory to a temporary storage location prior to transferring the requested data segment to the second local memory; and transferring the requested data segment to the main memory and directory storage is initiated upon receipt of an indication that the requested data segment has reached the temporary storage location.

16. A system for bypassing supervisory memory intervention for data transfers between first and second devices having associated local memories, wherein the supervisory memory includes a data storage array for storing a plurality of data segments and a directory storage array for maintaining ownership status of each of the data segments, and wherein the first device requests a transfer of a requested data segment currently residing in the local memory of the second device, the system comprising:

a routing control circuit configured and arranged to provide control signals to direct the movement of the requested data segment in response to a data fetch command provided by the first device;

an input queue coupled to receive the requested data segment from the local memory of the second device in response to first ones of the control signals;

an output queue coupled to receive a first copy of the requested data segment from the input queue in response to second ones of the control signals, and to complete the data transfer by providing the requested data segment to the local memory of the first device upon availability of the requested data segment in the output queue;

a crossbar interconnect circuit coupled to the routing control circuit to receive third ones of the control signals, and coupled to the input queue to receive a second copy of the requested data segment from the input queue, wherein the crossbar interconnect circuit, in response to the third control signals, forwards the second copy of the requested data segment to the supervisory memory to be stored and to allow the ownership status of the requested data segment to be revised to reflect new ownership by the first device; and wherein the transfer of the requested data segment from the second device to the first device occurs in parallel with the transfer of the requested data segment from the second device to the supervisory memory.

17. The system as in claim 16, further comprising:
a first device interface coupled to the first device to receive the fetch command from the first device;
a memory interface coupled to the first device interface to receive the fetch command, wherein the fetch command includes an address of the requested data segment;
a directory control circuit coupled to the memory interface to receive the address, and coupled to the directory storage array to receive the ownership status of the requested data segment in response to the address;
a second device interface coupled to the second device to provide a data return command to the second device when the directory control circuit establishes that the requested data segment is currently residing in the local memory of the second device; and
wherein the second device surrenders the requested data segment in response to the data return command.

18. The system as in claim 16, wherein the directory control circuit comprises means for modifying the ownership status.

19. The system as in claim 18, wherein the means for modifying the ownership status comprises means for changing the ownership status to a pending state until the supervisory memory receives the second copy of the requested data segment.

20. The system as in claim 16, wherein the system comprises a plurality of devices having associated local memories, and wherein the data transfers can be performed between any two of the plurality of devices.

21. The system as in claim 20, wherein the system comprises a plurality of the input queues and a plurality of the output queues, and wherein each of the plurality of devices is coupled to a different one of the plurality of the input queues to provide requested ones of the data segments, and wherein each of the plurality of devices is further coupled to a different one of the plurality of the output queues to provide requested ones of the data segments.

22. The system as in claim 16, further comprising a memory output queue coupled to the crossbar interconnect circuit to receive the second copy of the requested data segment and to forward the second copy of the requested data segment to the supervisory memory upon availability of the second copy of the requested data segment in the memory output queue.

23. The system as in claim 16, wherein the local memories comprise cache memories and the requested data segment comprises a requested cache line.

24. The system as in claim 16, wherein the first ones of the control signals comprise an address of the input queue which is to receive the requested data segment from the second device.

25. The system as in claim 24, wherein the second ones of the control signals comprise:
the address of the input queue that received the requested data segment; and
an address of the output queue which is to receive the first copy of the requested data segment from the input queue.

26. The system as in claim 24, wherein the system further comprises a memory output queue coupled to the crossbar interconnect circuit to receive the second copy of the requested data segment and to forward the second copy of the requested data segment to the supervisory memory upon availability of the second copy of the requested data segment in the memory output queue; and wherein the third ones of the control signals comprise:
the address of the input queue that received the requested data segment; and
an address of the memory output queue which is to receive the second copy of the requested data segment from the input queue.

27. A system for performing a direct data transfer from a first device having a requested data segment stored in a first local memory to a second device having a second local memory, the system including a main memory to provide supervisory storage capability and a directory storage for maintaining ownership status of each data segment of the main memory, comprising:
means for requesting a data transfer of the requested data segment in the first local memory to the second local memory of the second device;
first data transfer means for transferring the requested data segment from the first local memory to the second local memory of the second device in response to the data transfer request;
second data transfer means for transferring the requested data segment to the main memory and the directory storage to respectively store the requested data segment and revise the ownership status to reflect a change of ownership from the first device to the second device; and
wherein the transfer of the requested data segment to the second local memory is not dependent upon the transfer of the requested data segment to the main memory and directory storage.

28. The system as in claim 27, further comprising:
means for determining the ownership status of the requested data segment by accessing one or more ownership status bits corresponding to the requested data segment from the directory storage; and
means for allowing a direct transfer of the requested data segment from the first device to the second device where the one or more ownership bits establish the first device as the current owner of the requested data segment.

29. The system as in claim 28, further comprising means for setting the ownership status of the requested data segment to a pending state until the requested data segment has been transferred to the main memory and directory storage, at which time the ownership status is revised to reflect a new ownership of the requested data.

30. The system as in claim 29, wherein:
the first data transfer means comprises means for transferring a copy of the requested data segment to the second local memory while retaining the requested data segment in the first local memory if the data transfer request indicates a command where ownership privileges are not required by the second device; and
the ownership status is revised to reflect ownership by the main memory when the requested data segment has been transferred to the main memory and directory storage.

31. The system as in claim 29, wherein:
the first data transfer means comprises means for removing the requested data segment from the first local memory to the second local memory if the data transfer request indicates a command where ownership privileges are required by the second device; and the ownership status is revised to reflect ownership by the second device when the requested data segment has been transferred to the main memory and directory storage.

32. The system as in claim 27, further comprising control means for providing first control signals to control the transfer of the requested data segment to the second local memory, and for providing second control signals to control the transfer of the requested data segment to the main memory and the directory storage.

33. The system as in claim 32, further comprising first buffer means for receiving the requested data segment from the first local memory, and for temporarily storing the requested data segment until receiving the first control signals at which time a first copy of the requested data segment is provided to the second local memory.

34. The system as in claim 32, further comprising second buffer means for receiving a second copy of the requested data segment from the first buffer means and for temporarily storing the second copy of the requested data segment until receiving the second control signals at which time the second copy of the requested data segment is provided to the main memory and the directory storage.

* * * * *